United States Patent [19]
Santin et al.

[11] Patent Number: 5,313,848
[45] Date of Patent: May 24, 1994

[54] DISPOSABLE ELECTRONIC MONITOR DEVICE

[75] Inventors: Ernest M. Santin, Beverly; William A. Tout, North Andover; Peter M. Nunes, Newburyport; John W. Vanderpot, Rockport; Donald W. Berrian, Topsfield, all of Mass.

[73] Assignee: Sensitech, Inc., Beverly, Mass.

[21] Appl. No.: 778,777

[22] Filed: Oct. 18, 1991

[51] Int. Cl.[5] .................. G01D 1/00; G01D 1/04; G01D 1/10; G01K 7/00
[52] U.S. Cl. ................. 73/866.2; 364/571.04; 374/102; 374/103; 374/104; 374/108; 374/170; 73/492
[58] Field of Search ............... 73/866.1, 866.3, 866.2, 73/753, 335.02, 517 R, 492, 503; 374/102, 103, 104, 108, 170; 364/556, 557, 558, 571.01–571.08; 340/870.04

[56] References Cited

U.S. PATENT DOCUMENTS

| | | | |
|---|---|---|---|
| 4,161,782 | 7/1979 | McCracken | 364/571.03 |
| 4,198,677 | 4/1980 | Brunner et al. | 364/571.04 |
| 4,303,984 | 12/1981 | Houvig | 364/571.07 |
| 4,418,392 | 11/1983 | Hata | 364/571.07 |
| 4,536,851 | 8/1985 | Germanton et al. | 374/108 X |
| 4,638,444 | 1/1987 | Laragione et al. | 364/558 X |
| 4,845,649 | 7/1989 | Eckardt et al. | 73/146.2 X |
| 4,858,615 | 8/1989 | Meinema | 73/1 R X |
| 4,879,669 | 11/1989 | Kihara et al. | 364/571.01 X |
| 4,980,847 | 12/1990 | Hirano | 364/571.03 |
| 5,089,979 | 2/1992 | McEachern et al. | 73/1 R X |

FOREIGN PATENT DOCUMENTS

| | | | |
|---|---|---|---|
| 2232948 | 1/1974 | Fed. Rep. of Germany | 73/866.1 |
| 259130 | 11/1986 | Japan | 374/104 |
| 267 | 1/1987 | PCT Int'l Appl. | 364/571.04 |
| 2045840 | 10/1980 | United Kingdom | 374/102 |
| 2058357 | 4/1981 | United Kingdom | 374/103 |
| 2079951 | 1/1982 | United Kingdom | 374/108 |

OTHER PUBLICATIONS

"Datatrace Micropack" product specification, publication date unknown but by Feb. 1992, 2 pages.
"Datatrace PC Interface System" product specification, publication date unknown but by Feb. 1992, 2 pages.
"Datatrace Hamster" product specification, publication date unknown but by Feb. 1992, 2 pages.
"The Reliable Ryans", advertising/price brochure, published by Mar. 1, 1990 17 pages.
"3M Announces the Fusion of Time and Temperature . . .", product brochure, publication date by Nov. 1, 1989 14 pages.
"Freshness Control From Plant to Plates . . ./Lifelines", product brochure, publication date 1989 12 pages.

Primary Examiner—Tom Noland
Attorney, Agent, or Firm—Lappin & Kusmer

[57] ABSTRACT

Apparatus for monitoring an externally applied parameter to selected products. The invention involves a housing enclosing a sensor, and a monitoring and output network. The sensor has a characteristic that varies in some predetermined manner with variation in the monitored parameter. The monitoring and output network involves a sensor which produces a signal representative of the monitored characteristic. Values associated with the signal are stored in a memory device for subsequent, selected retrieval.

12 Claims, 2 Drawing Sheets

DISPOSABLE ELECTRONIC MONITOR DEVICE

BACKGROUND OF THE INVENTION

The present invention relates to electronic monitor devices intended for disposable use in packaging. Such devices may monitor temperature, humidity, pressure, acceleration, and other parameters which may affect transported goods.

Temperature monitors are important in any industry involving products that are temperature sensitive. This includes such broad categories as food and beverages, medical and pharmaceuticals, biologicals, and industrial chemicals and adhesives. In addition to producers within these industries, monitoring the environment of products is important to distributors, suppliers, storage facilities, and large service providers such as hospitals, the military, and large restaurant chains.

Within each of these industries there are a variety of reasons for using an environment monitoring device. For example, such monitors may be used as an aid in controlling product quality, to monitor the performance of shippers, to minimize product loss due to temperature exposure, and to aid in identifying responsible parties in instances of product loss. It is known that substantial amounts of fresh produce are lost each year in the transportation phase of distribution, largely due to temperature variations during transport.

While temperature is a significant cause of damage to transported goods, it is not the only cause of damage. Other identified causes include improperly stacked boxes resulting in shock to the packaging, improper packaging materials leading to shatter, product damage during loading, and moisture loss. Improper handling often leads to in-transit vibration which may aggravate problems started at the packing house. It may be important, in a given field, to monitor any one or all of these factors to control shipping loss to goods.

Over the years, commercially available products have been developed to monitor temperature for transportation of goods. These products often include strip recorders that produce hard copy output. The classic strip recorder recorded temperature on a revolving drum, the speed of which could be altered depending upon the amount of time that needed to be recorded. Modern strip recorders are more likely to be digital and will store the information as it is recorded for later retrieval. For those devices, a specialized reader or a computer with a graphics capability printer is required to read out the recorded information. One commercially available product incorporating such a strip recorder is manufactured by Ryan Instruments, Redmond, Wash.

The Ryan monitors are relatively large, and are intended to be installed either in the environment of a transportation vehicle, or in large containers containing the temperature-sensitive goods. The Ryan monitors record temperatures in memory, and the recorded information is accessible by an external access device, such as a computer, by printout using a bimetal coil recorder, or by visual LCD display. Various models of Ryan monitors test for humidity, with similar forms of data output.

Control One, Inc., Stamford, Conn., manufactures a line of time and temperature monitors. These devices have internal recorders utilizing stainless steel or Teflon probes. Temperature readings may be taken as often as every four seconds, or as infrequently as once every 72 hours. These devices are generally housed in a closed housing unit which can be selectively turned on and off. In many shipping situations it is undesirable to enable the user to turn off an activated system, since it would facilitate fraudulent readings.

Both the Ryan and the Control One devices are pre-programmed by the manufacturer to read a broad range of temperatures, or an end-user specified range. Both manufacture devices which may be coupled to an external printing device, and some must be returned to the manufacturer for a secure parameter reading.

A third type of device is manufactured by 3M, St. Paul, Minn. These "product exposure indicators" give visual signals of temperature exposure. The devices are generally in the form of tags and labels which record the cumulative exposure time spent over certain temperatures. These indicators function by means of an irreversible physical change. If exposure occurs beyond a specific temperature level, these indicators detect and record the extended temperature elevation.

In an exemplary 3M device, each tag has a temperature set point, and visually indicates the temperature change by color change or indicator movement. Each tag has a series of viewing windows on the top surface, protected by a clear film overlay. When the activation temperature of the tag is exceeded, e.g., above 10° C., a blue color appears in a window, and gradually moves across the tag windows with time. Movement of the color indicator is halted if temperature falls below the set point, and resumes again with temperature rise. The location of coloration shown through the viewing windows is a function of time and temperature. That is, a short period of exposure at a relatively high temperature will result in coloration comparable to a longer period of exposure at a lower temperature.

These types of devices do not enable long-term parameter monitoring against user-determined preselected parameters. It is important that the monitoring device be tamper-resistant, to prevent manipulation of the recorded readings. It is also desirable that the end-user be able immediately to take a reading of any temperature fluctuation. Cumulative measurements are not as useful as discrete event detection for those situations when short-term exposure to extreme temperatures is detrimental to the goods, such as pharmaceuticals or other biological materials.

Accordingly it is an object of the present invention to provide a relatively accurate, dynamic and inexpensive way to monitor the temperatures to which products are subjected during shipment.

SUMMARY OF THE INVENTION

The present invention generally relates to apparatus for monitoring an externally applied parameter, such as temperature, to selected products.

More specifically, the invention involves a housing enclosing a sensor, and a monitoring and output network. The sensor has a characteristic that varies in some predetermined manner with variation in the monitored parameter. For example, if the parameter to be measured is temperature, the sensor has a characteristic that varies in response to changes in temperature. Alternatively, the sensor may have a characteristic that varies with such parameters as pressure, acceleration, and humidity.

The monitoring and output network involves a sensor which produces a signal representative of the monitored characteristic. Values associated with the signal, e.g., actual temperature values, are stored in a memory device for subsequent, selected retrieval. The values may be retrieved by means of a read-out device selectively coupled to the monitor apparatus, or may be displayed on a visual display device. The network may be an integrated circuit, and is adapted to monitor the output of the sensor.

The apparatus may store several different values. For example, one value may represent a combination of the maximum value for a selected characteristic, together with the time that value was achieved. Another value may represent the minimum value for the selected characteristic, together with the time at which that value was reached. Another value may correspond to the time integral of the selected characteristic above or below a predetermined threshold value. Time measurements may include: the time that the particular value of a signal first exceeded a predetermined threshold value; the time that the value of the signal most recently exceeded a predetermined threshold value; the time that the value of the signal first fell below a predetermined threshold value; and/or the time that the value of the signal most recently fell below a predetermined threshold value.

BRIEF DESCRIPTION OF THE DRAWINGS

These and other advantages of the present invention will be more fully understood by reference to the following detailed description in conjunction with the attached drawings in which.

DETAILED DESCRIPTION OF THE PREFERRED EMBODIMENT

The present invention generally is a programmable electronic monitor device for measuring selected parameters, such as ambient temperature, and humidity. While the illustrated, preferred embodiment is described below in terms of a temperature monitor, equivalent devices for measuring other parameters such as pressure, humidity, and acceleration, are contemplated as falling within the scope of this disclosure.

Generally, the device monitors preselected parameters associated with transportation and/or storage of goods. The values obtained for the parameters are internally compared against a predetermined set of threshold values. Identified instances of inconsistency or consistency between the threshold values and actual measurements are reported. Parameters and values may be stored in a memory device for subsequent interrogation by the end-user.

In one embodiment where the monitored parameter is temperature, the device compares temperatures encountered in storage or transit, to a previously established range of acceptable values. The device may then store selected data, such as data representative of (1) the occurrence of excursions outside of the acceptable range, (2) times of occurrence of the first cross-over and last cross-over from acceptable values to overage and/or underage (measured with respect to the acceptable value range) for excursions outside the acceptable range, (3) times of occurrence of and magnitude of the extreme values during excursions outside the acceptable range, and (4) the number of out-of-range excursions. Generally, the stored information may be retrieved in two ways: 1) visual display upon user-activation of a display device; or 2) down-loading to an external computer device.

Figure 1:
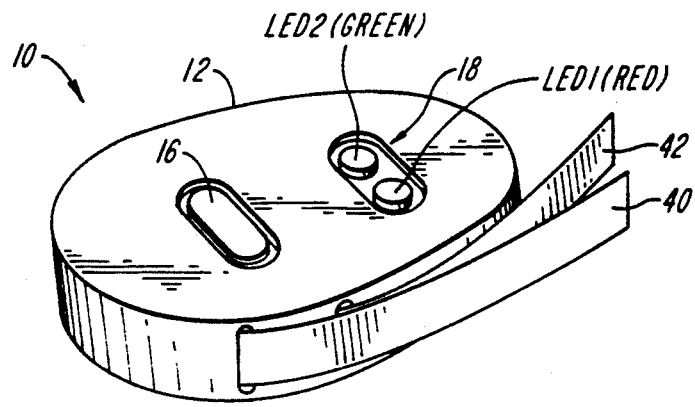
FIG. 1 is a perspective view of a temperature monitoring device embodying the present invention.

A preferred embodiment of the present invention is shown in FIG. 1. In that illustrated embodiment, the device 10 includes a housing element 12. The housing element 12 encloses an internal thermistor 14 and associated circuit 14a (both shown in FIG. 2) and an optical port 18, such as a pair of light emitting diodes (LED's), LED1 (RED) and LED2 (GREEN). In the illustrated embodiment of FIG. 1, the device 10 includes data output control switch 16, which is adapted to initiate a data output operation. In the illustrated embodiment, the optical port 18 and output control switch 16 are mechanically keyed to interface with an output device 50 (shown in FIG. 3). The output device 50 may be a computer, a printer, or a specially-adapted device for receiving input from the device 10 through port 18 upon activation of switch 16.

The housing element 12 of illustrated device 10 is preferably manufactured using acrylonitrile butadiene-styrene (ABS) that is formed into the desired shape using conventional molding methods. The shape of the housing element may be round, oval, or any other geometric configuration. The illustrated housing element has a diameter of approximately 2.5 inches, a height of approximately 0.625 inches, and a weight of approximately 42 grams. However, the housing element may have different dimensions, depending upon the size of the individual components contained within. A pair of electrically insulating flexible pull-strips 40 and 42 extend from slits in the sidewall of housing 12.

The internal thermistor is thermally coupled to the external environment-to-be-monitored, and consists of any material, such as a semiconductor material which is reactive to changes in the designated parameter, such as temperature. Alternatively, devices selectively sensitive to other parameters, such as shock, humidity, or ambient pressure, may be used.

The device 10 further may include an indicator test button 20 to initiate a visual read-out at the port 18 indicative of whether the device 10 is operative at any point in time without disrupting the monitoring function of the device. Alternatively, a separate blinking LED may be used to indicate the operative state of the device. Other features may be added to the device to augment monitoring activities or read-out capabilities. These additional auxiliary features are contemplated as being within the scope of the present invention.

Figure 2:
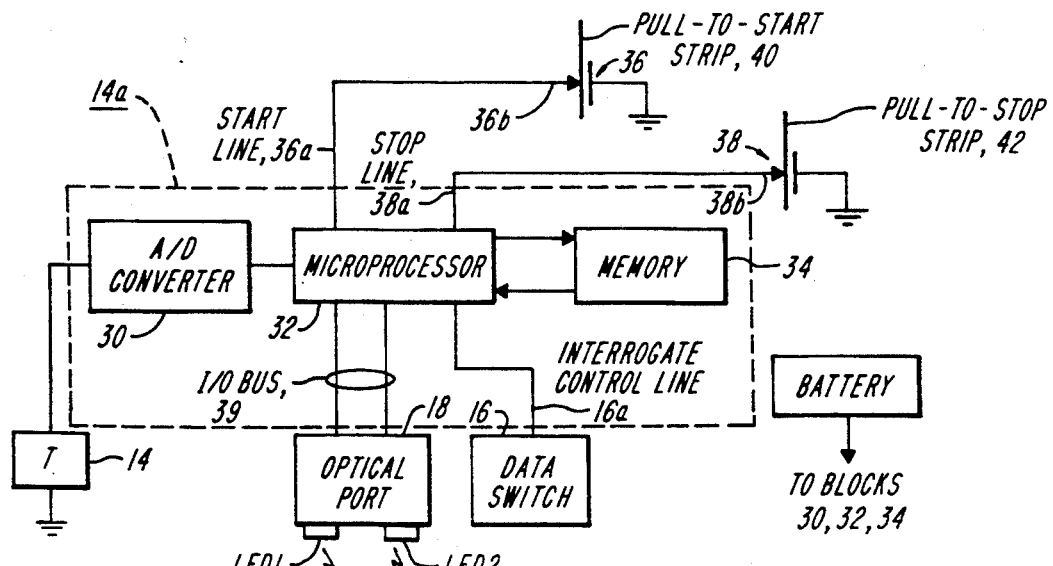
FIG. 2 shows in block diagram form the circuit of the embodiment of FIG. 1.

FIG. 2 shows thermistor 14 and circuit 14a for device 10. The circuit 14a is a microprocessor-controlled network that is coupled between thermistor 14 and the optical port 18. Circuit 14a includes an analog-to-digital converter 30 coupled in series between thermistor 14 and a microprocessor 32 and associated memory (storage) device 34. A start device 36 and a stop device 38 are coupled by way of a START signal line 36a and a STOP signal line 38a, respectively, to the microprocessor 32. The microprocessor 32 is coupled to optical port 18 by way of input/output (I/O) bus 39. Preferably, the circuit 14a is a single integrated circuit, permitting a low cost, compact, and low power implementation. In such embodiments, the device 10 may be operated over relatively long periods of time under battery power, yet still be sufficiently low cost to be considered "disposable", especially compared with prior art monitoring devices.

In the preferred embodiment, the microprocessor 32 is programmed to operate in three modes: (1) sleep mode, (2) monitor mode and (3) stop mode. In the sleep mode, the device 10 is programmed to establish a predetermined range of allowed values of temperature (thereby inherently defining a non-allowed range). In this mode, relatively low power is drawn from the battery to keep the programmed device ready for operation in the monitor mode.

In the monitor mode, the measuring and processing functions of circuit 14a are activated, so that the device 10 actively monitors temperature and then determines and store the temperature data relating to environment of device 10. In the stop mode, the measurement and processing functions are irreversibly stopped, and the device 10 is maintained in a low power consumption mode, and is adapted for externally triggered read-out of the stored data from memory 34.

The start device 36 and stop device 38 are each coupled to input lines of the microprocessor 32. Devices 36 and 38 are independently actuable by a user to signal a desired change in the mode of operation of the device 10. In the illustrated embodiment, each of devices 36 and 38 includes an electrically insulating "pull-strip" (pull-strip 40 for device 36 and pull-strip 42 for device 38) positioned between a terminal 36b at an end of the START signal line 36a and a ground connection for device 36 and a terminal 38b at the end of the STOP signal line 38a and a ground connection for device 38. The distal ends of pull-strips extend through associated slots in the sidewall of housing 12. Terminals 36b and 38b are both spring biased against their respective ground connection so that the respective one of insulating pull-strips 40 and 42 may be removed from device 10, thereby establishing a ground potential at the respective one of lines 36a and 38a. The microprocessor 32 is programmed so that when pull-strip 40 is removed from start device 36, then device 10 transitions from its sleep mode to its monitor mode, and when pull-strip 42 is removed from stop device 38, then device 10 transitions from the monitor mode to the stop mode. In this configuration, an economical, tamper-resistant temperature monitoring device is provided.

The optical port 18 may be selectively operative to enable a user to obtain a visual indication of certain selected conditions. For example, in the illustrated embodiment, the optical port 18 consists of a red LED and a green LED, LED1 (RED) and LED2 (GREEN). These LED's are operatively coupled to a data switch 16 which, when depressed, signals (via line 16a) microprocessor 32 that a data interrogation operation is to be initiated in response to that signal.

If there has been no out-of-range excursion since device 10 has been activated in its monitor mode (as described below), then microprocessor 32 causes the green LED2 to be illuminated in a coded manner to generate an optical signal representative of the stored data from memory 34 which is indicative of the highest and lowest temperatures (and times of occurrence) since activation.

If there has been at least one out-of-range excursion since activation, microprocessor 32 causes red LED1 to be illuminated in a coded manner to generate an optical signal representative of the stored data from memory 34 indicative of out-of-range related data, as described below.

Thus, with the invention, device 10 included an optical port that provides optical data that (1) may be interpreted visually by a user (to decide if no out-of-range excursions have occurred (green) or to decide if there were such excursions (red) and (2) may be down-loaded to a computer to give specific characteristics of the monitored temperature.

Figure 3A:
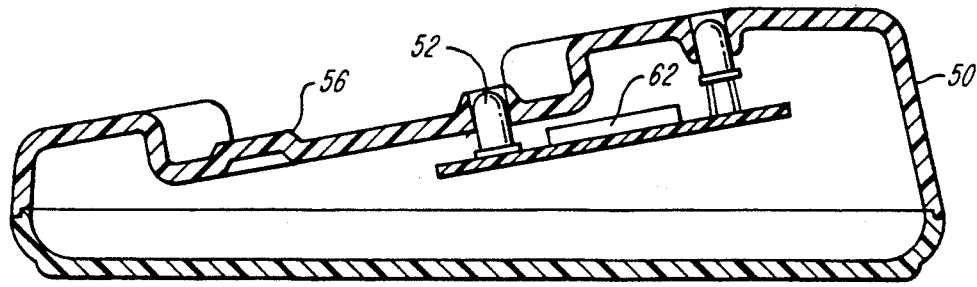
FIG. 3A is a sectional view of the interrogation device of FIG. 3.
Figure 3:
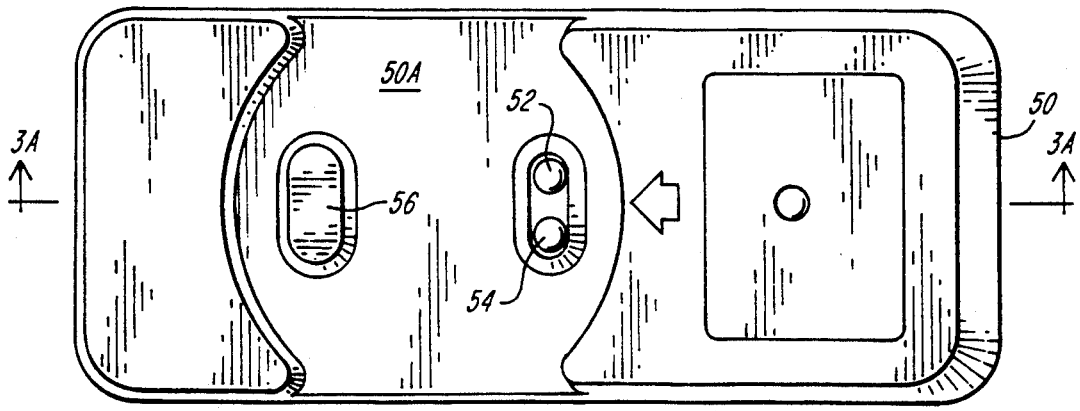
FIG. 3 is a top elevation view of an interrogation device for the monitoring device of FIG. 1.

FIG. 3 shows a read-out device 50 that is adapted to down-load (or read out) stored data from device 10. Read-out device 50 includes an interface region 50A that has a surface that is substantially complimentary to the upper surface of device 10. A pair of photoreceptors 52 and 54 and an outwardly protruding extension member 56 are positioned in region 50A with a geometrical layout corresponding to that of LED1, LED2, and data switch 16. With that configuration, the device 10 may be placed so that the complementary regions of devices 10 and 50 are adjacent and the photoreceptors 52 and 54 are aligned with LED1 and LED2, respectively, of optical port 18, and so that the extension member 56 is adjacent to and depresses data switch 16. Device 50 includes a microprocessor controlled circuit (indicated by reference designation 62a in FIG. 3) that is adapted to receive the optical signals generated by LED1 and LED2 and to process that data in a manner desired by a user, for example, print out that data in hard copy form. The device 50 may in some embodiments be configured as an interface to a conventional programmed digital computer.

In the illustrated embodiment, the thermistor 14 receives a signal from the environment representative of a change in temperature. The thermistor 14 communicates the change to the circuit 14a, which circuit includes a memory device 34 for storing preselected parameters, and for storing the temperature change detected by the thermistor 14.

Figure 4:
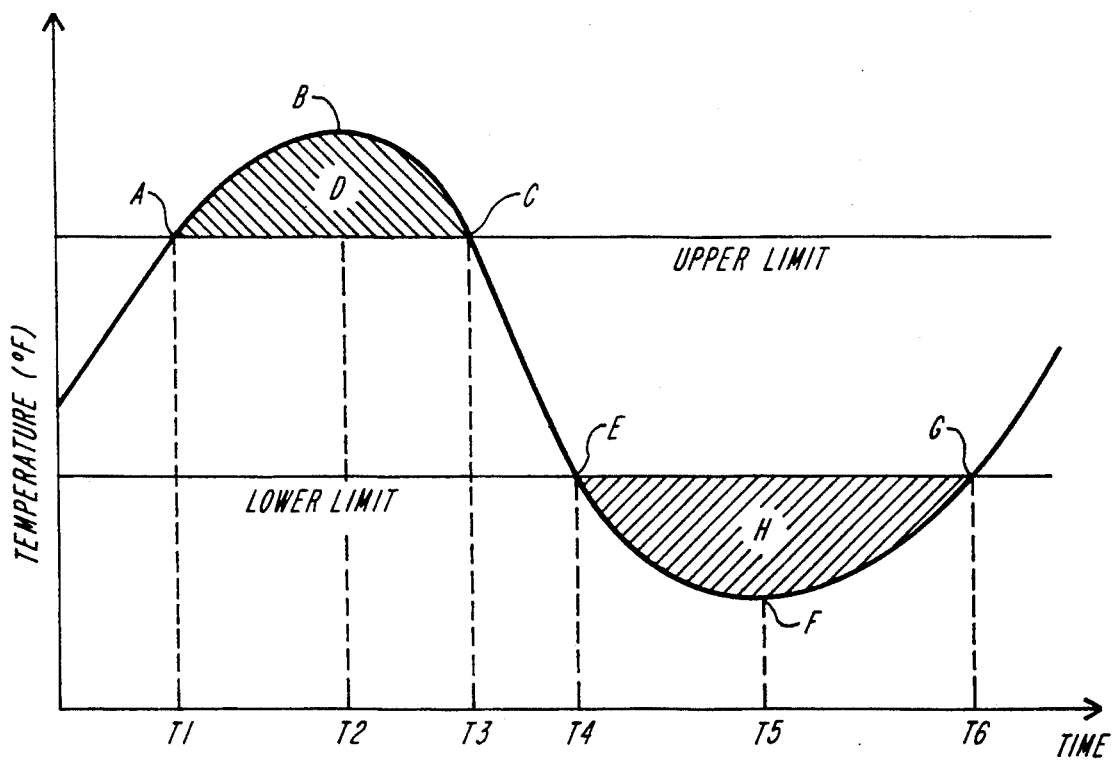
FIG. 4 is a graph illustrating the various temperature parameters that may be monitored using an embodiment of the present invention.

The device 10 may be preferably programmed to compare actual parameter readings against pre-programmed parameters. FIG. 4 shows exemplary output data which may be stored in memory of the device 10 for subsequent retrieval. In FIG. 4, a graph of temperature versus time is shown with respect to an allowed range of temperatures between an upper limit and a lower limit. Point A on the graph defines the time T1 that a first over-temperature reading occurred. Point B defines both the peak temperature experienced by the device and the time T2 that the peak temperature occurred. Point C defines the time T3 that a last over-temperature event occurred, and the area D under the curve and above the upper limit represents the time integral of over-temperature for the excursion between T1 and T3. In cases where a succession of over-temperature excursions occur, the cumulative time integral of the over-temperature excursions is stored. These measurements are made relative to the upper limit of the device as it is pre-programmed into the memory of the device by either the end-user or the manufacturer.

Regarding measurements made relative to the pre-programmed lower limit of the device, these are comparable to those measurements made relative to the upper limit. As illustrated in FIG. 4, the time T4 of first under-temperature measurement is encountered is shown as Point E. Point F represents both the lowest temperature encountered and the time T5 that temperature was encountered. The time T6 that the last under-temperature occurred is shown at Point G. The area between the temperature curve and the lower limit represents the time integral of under-temperature excursions. Where there is a succession of under-temperature excursions, the cumulative integral of those excursions is stored. All of the data A through H are stored in memory 34 of device 10, together with data representative of the number of out-of-range excursions of temperature (i.e. 2). These parameters are exemplary, and other parameters and dynamic measurements may be performed by embodiments of the present invention.

As an example, Table I shows a set of data representative of the read-out of an exemplary device 10 set for temperature limits of 80° F. and 60° F., with 2 minute measurement intervals and a 2 minute start-up delay, where the start pull-strip was pulled at 8:50 A.M. on Sep. 16, 1991 and the stop pull-strip was pulled at 11:16 A.M. on Oct. 1, 1991.

---

Record read: 11:16 A.M. 10/01/1991 Temperature: 76° F. (75.73)
CONFIGURATION:
   Serial number: 100
   Temperature limits: 80° F. 60° F.
   Measurement interval: 2 min
   Startup delay: 2 min
   Offset: 0
   Counter threshold: 2° F.
MEASURED DATA:
   Record start: 08:50 A.M. 09/16/1991
   end: 11:16 A.M. 10/01/1991
   Temperature extremes:
   84° F. 08:56 A.M. 09/19/1991
   54° F. 07:26 A.M. 09/29/1991
OVER TEMPERATURE:
   Time: 76 min   Area: 138° F. × min
   First time: 10:50 A.M. 09/18/1991
   Last time: 06:42 P.M. 09/27/1991
   Number of events: 2
UNDER TEMPERATURE:
   Time: 2346 min   Area: 8190° F. × min
   First time: 03:20 A.M. 09/28/1991
   Last time: 08:42 A.M. 09/30/1991
   Number of events: 3

---

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for monitoring an externally applied parameter, comprising
a housing enclosing:
  A. a sensor having a characteristic that varies in a predetermined manner with variation of said parameter;
  B. a monitoring and output network including:
    i. means coupled to said sensor for generating a signal representative of variations of said characteristic over time,
    ii. first storage means for storing values associated with selected portions of said signal, said selected portions including other than the most recent portion of said signal, and
    iii. selectively operative means for generating an output signal representative of selected ones of said stored values; and
  C. a power supply in operable communication with said sensor and said network.

2. Apparatus according to claim 1 wherein said parameter is selected from the group consisting of temperature, pressure, humidity, and acceleration.

3. Apparatus according to claim 1 wherein said monitoring and output network is an integrated circuit.

4. Apparatus according to claim 1 wherein said first storage means includes means for generating and storing at least one of the group consisting of:
  A. the value of said signal representative of the maximum value of said characteristic and the time of generation of said value;
  B. the value representative of the minimum value of said characteristic and the time of generation of said value;
  C. the value corresponding to the time integral of said characteristic beyond a predetermined threshold value;
  D. the time that the value of said signal first exceeded a predetermined threshold value;
  E. the time that the value of said signal most recently exceeded a predetermined threshold value;
  F. the time that the value of said signal first fell below a predetermined threshold value; and
  G. the time that the value of said signal most recently fell below a predetermined threshold value, and
  H. the number of excursions beyond a predetermined threshold value.

5. Apparatus according to claim 4 wherein said parameter is selected from the group consisting of temperature, pressure, humidity, and acceleration.

6. Apparatus according to claim 4 wherein said monitoring and output network is an integrated circuit.

7. Apparatus according to claim 6 wherein said output signal coding is binary.

8. Apparatus according to claim 4 wherein said output means includes an optical signal generator for generating said output signal, said output signal being visually perceptible and being coded to be representative of said selected ones of said stored values.

9. Apparatus according to claim 1 further comprising selectively operative means for interrogating said monitoring and output network and for generating data representative of selected ones of said stored values.

10. Apparatus according to claim 1 further comprising
  remotely adjustable second storing means for storing predetermined comparative values, and
  means for comparing said stored values of said signal with said comparative values, said comparing means including means for generating a signal representative of any discrepancy between said stored values from said first storage means and said comparative values of said second storage means.

11. Apparatus according to claim 1 wherein said output means includes an optical signal generator for generating said output signal, said output signal being visually perceptible and being coded to be representative of said selected ones of said stored values.

12. Apparatus according to claim 11 wherein said output signal coding is binary.

* * * * *